US010414659B2

(12) United States Patent
Medina et al.

(10) Patent No.: US 10,414,659 B2
(45) Date of Patent: Sep. 17, 2019

(54) METHOD OF RECYCLING CHITOSAN AND GRAPHENE OXIDE COMPOUND

(71) Applicant: United States of America as Represented by The Secretary of The Army, Alexandria, VA (US)

(72) Inventors: Victor F Medina, Clinton, MS (US); Jose Mattei-Sosa, Vicksburg, MS (US); Christopher S Griggs, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 15/672,241

(22) Filed: Aug. 8, 2017

(65) Prior Publication Data

US 2019/0047869 A1 Feb. 14, 2019

(51) Int. Cl.
| | |
|---|---|
| *C09D 5/14* | (2006.01) |
| *B01D 71/02* | (2006.01) |
| *B01D 71/74* | (2006.01) |
| *C04B 14/02* | (2006.01) |
| *C04B 18/24* | (2006.01) |
| *C08B 37/08* | (2006.01) |
| *C01B 32/198* | (2017.01) |
| *C09D 105/08* | (2006.01) |

(52) U.S. Cl.
CPC .......... *C01B 32/198* (2017.08); *C04B 14/022* (2013.01); *C04B 18/24* (2013.01); *C08B 37/003* (2013.01); *C09D 5/14* (2013.01); *C09D 105/08* (2013.01); *B01D 71/024* (2013.01); *B01D 71/74* (2013.01)

(58) Field of Classification Search
CPC ... C01B 32/198; C01B 31/04; C01B 31/0407; C01B 31/0415; C01B 31/0423; C01B 31/043; C01B 31/0438; C01B 31/0446; C01B 31/0453; C01B 31/0461; C01B 31/0469; C01B 31/0476; C01B 31/0484; C01B 31/0492; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32; C04B 14/022; C04B 18/24; C08B 37/003; C09D 5/14; C09D 105/08; B01D 71/024; B01D 71/74
USPC ......................................................... 423/448
See application file for complete search history.

(56) References Cited

U.S. PATENT DOCUMENTS

| | | | | |
|---|---|---|---|---|
| 2014/0079932 A1* | 3/2014 | Aksay | ..................... | B82Y 30/00 428/219 |
| 2014/0242870 A1* | 8/2014 | Hwang | ................... | A61L 27/20 442/327 |

FOREIGN PATENT DOCUMENTS

WO    WO 2013/096990    * 4/2013    ............. C04B 7/345

OTHER PUBLICATIONS

Hong, et al., Sulfuric Acid Intercalated Graphite Oxide for Graphene Preparation, Scientific Reports 2013; 3: 3439, pp. 1-6 (Year: 2013).*
(Continued)

*Primary Examiner* — Daniel C. McCracken
(74) *Attorney, Agent, or Firm* — Brian C. Jones

(57) ABSTRACT

A method of creating storing and using recycled graphene oxide materials to create highly resilient objects having desirable qualities of graphene.

13 Claims, 6 Drawing Sheets

(56) References Cited

OTHER PUBLICATIONS

Fan, et al., Fabrication, Mechanical Properties, and Biocompatibility of Graphene-Reinforced Chitosan Composites, Biomacromolecules 2010; 11: 2345-2351 (Year: 2010).*

Zhang, et al., Fabrication of highly porous biodegradable monoliths strengthened by graphene oxide and their adsorption of metal ions, Carbon 2011; 49: 827-937 (Year: 2011).*

Medina, et al, Fabrication, Characterization, and Testing of Graphene Oxide and Hydrophilic Polymer Graphene Oxide Composite Membranes in a Dead-End Flow System, J. Environ. Eng. 2017; 143(11): 04017072-1 to 04017072-8 (Year: 2017).*

* cited by examiner

200

100

102

METHOD OF RECYCLING CHITOSAN AND GRAPHENE OXIDE COMPOUND

STATEMENT REGARDING FEDERALLY SPONSORED RESEARCH OR DEVELOPMENT

The invention described herein was made by employees of the United States Government and may be manufactured and used by the Government of the United States of America for governmental purposes without payment of royalties.

FIELD OF INVENTION

This invention relates to a method for producing, storing and using recycled graphene oxide materials to produce highly resilient structures.

BACKGROUND OF THE INVENTION

Graphene is approximately 200 times stronger than the strongest steel, extremely lightweight. Currently, there is no effective way to mass produce graphene, and the use of graphene has been confined the semi-conductor industry. While there is ongoing research into methods for mass-production of graphene, the cost of graphene for large scale projects and general use beyond the semi-conductor industry will remain high.

Graphene oxide is much more readily available than pure graphene. It can be formed into membranes for water and wastewater treatment, and has antimicrobial properties.

Commonly assigned U.S. patent application Ser. No. 15/671,043 ("the '043 Application") teaches the use of a novel graphene oxide and chitosan composite to produce scalable and highly-durable water filters developed by the U.S. Army Corps of Engineers Research and Development Center's Environmental Laboratory.

The chitosan graphene oxide composite taught by the '043 Application has multiple applications. The costs of producing the compound includes both the cost of the graphene oxide acquired for the process and the production costs for creating the compound in the correct proportions.

Scientists at the U.S. Army Corps of Engineers anticipate constructing large scale filters and other public works comprised of chitosan graphene oxide compound disclosed in the '043 Application.

There is an unmet need to minimize the cost associated with the use of graphene oxide by recycling graphene oxide products to create reclaimed materials that can be re-used for production or used in other compounds.

BRIEF SUMMARY OF THE INVENTION

The invention is method for producing, storing and reusing chitosan/graphene oxide compounds comprised of the steps of maximizing solution to solid contact, immersing and dissolving the chitosan/graphene oxide object in an acidic solution, and producing a stored chitosan/graphene oxide compound in a desired physical form. In various embodiments, the recycled chitosan/graphene object may be stored as a solution or powder, or evaporated to create objects.

In various embodiments the method may be applied to reclaim material used to produce a (GSGO) filtration membrane.

TERMS OF ART

As used herein, the term "cross-linking" means binding two materials at the molecular level.

As used herein, the term "CSGO" means chitosan graphene oxide.

As used herein, the term "disk-shaped" means a disk-like structure of a filtration membrane.

As used herein, the term "filtration membrane" means a thin layer of semi-permeable material that separates molecules, particles or substances that pass through it.

As used herein, the term "highly-resilient" means durable and able to be used for various applications.

As used herein, the term "membrane support layer" means a structure for supporting a CSGO filter.

As used herein, the term "spiral wound" is a spiral-like structure of the filtration membrane.

As used herein, the term "target thickness" means a desired thickness to be achieved for creation of a filtration membrane relative to its intended use.

DETAILED DESCRIPTION OF THE DRAWINGS

Figure 1:
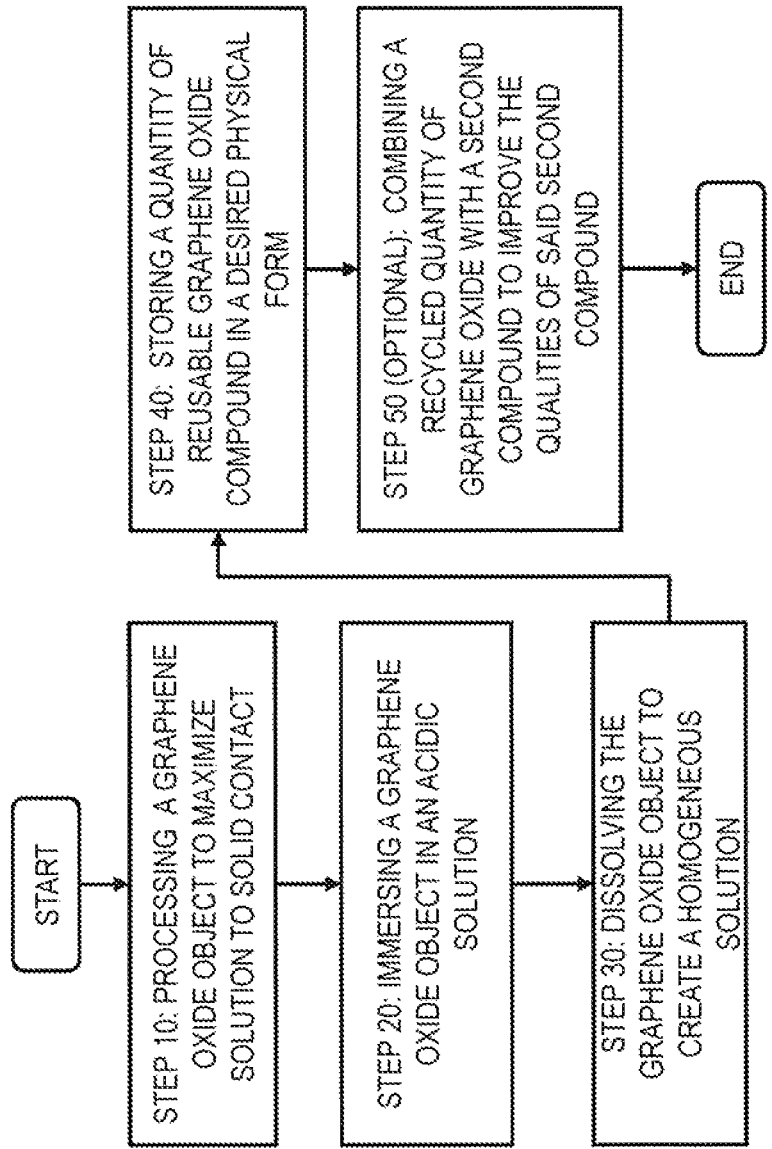
FIG. 1 illustrates an exemplary method for recycling a graphene oxide material.

FIG. 1 is a flow chart of an exemplary method for recycling graphene oxide material 100. In various embodiments, the method may be applied to graphene oxide objects of any scale and graphene oxide objects comprised of various compositions.

Step 10 is the step of processing a graphene oxide object to maximize solution to solid contact. In various embodiments, this step may include a mechanical or non-mechanical process of punching, shredding and grounding.

Step 20 is the step of immersing a graphene oxide object in an acidic solution. The method of claim 1 wherein said solution is comprised of acetic acid consisting of 8.3 mL of 99% glacial acetic acid per liter of water.

Step 30 is the step of dissolving the graphene oxide object to create a homogeneous solution. In many embodiments, this step will be accomplished by mechanical or non-mechanical stirring.

Step 40 is the step of storing a quantity of reusable graphene oxide compound in a desired physical form. In various embodiments, the reusable graphene oxide compound may be stored as a solution. Other embodiments may include the step the evaporating said graphene oxide solution to form a solid. In still other embodiments, the solid formed from evaporation may be pulverizing said solid to form a powder. The reusable graphene oxide compound produces may be used to create newly manufactured objects and filters or as a compound for repair or coating objects made of any material.

Step 50 (Optional) is the step of combining a recycled quantity of graphene oxide with a second compound to improve the qualities of said second compound. In one embodiment, the second compound may be concrete which is combined with quantity of reusable graphene oxide compound stored as a powder.

Figure 2:
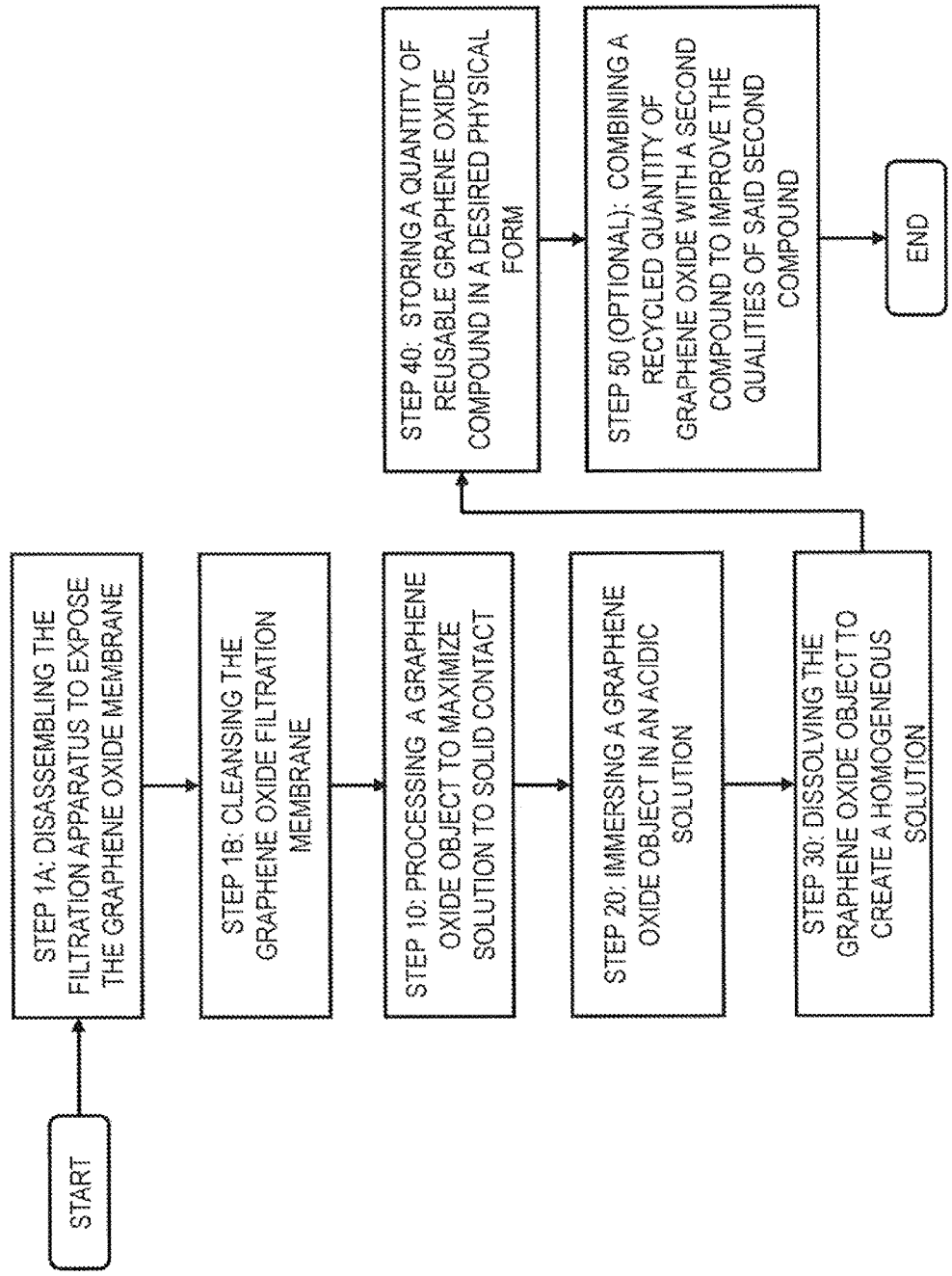
FIG. 2 illustrates an exemplary method illustrates an exemplary method for recycling a highly resilient graphene oxide filtration membrane, which chitosan graphene oxide (CSGO) filtration membrane recovered from a filtration apparatus.

FIG. 2 illustrates an exemplary method for recycling a highly resilient graphene oxide filtration membrane, which is a chitosan graphene oxide (CSGO) filtration membrane recovered from a filtration apparatus.

illustrates an exemplary method 200 for recycling a chitosan/graphene oxide filtration apparatus. The steps of this method include the steps of Method 100.

In Method 200, steps 1A and 1B are performed to prepare a filtration apparatus for recycling prior to performing recycling steps of Method 100.

Step 1A is the step of disassembling the filtration apparatus to remove support layers and other material that is not made of graphene oxide from a filtration device.

Step 1B is the step of cleansing the graphene oxide filtration membrane. In one embodiment, this is accomplished backwash filter to remove contaminants from said chitosan/graphene oxide object. In various embodiments, this may also include removing one or more layers of material from said chitosan/graphene oxide object.

Small pieces of support material stuck on the chitosan/graphene MAY placed in the acid reactor. When the chitosan/graphene oxide material is dissolved, the solid support material can be recovered by picking it out or by a large screen filtration.

Figure 3:
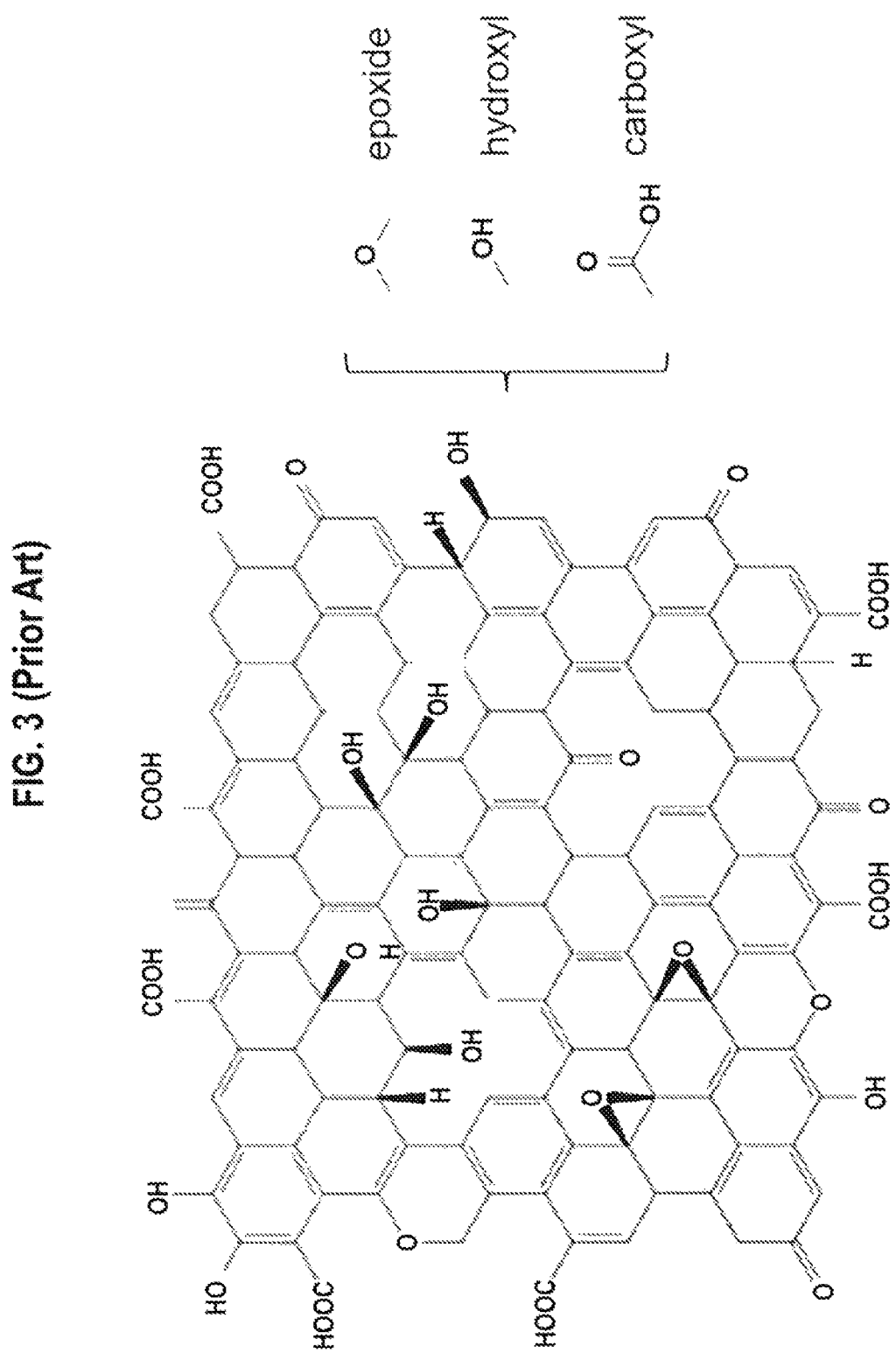
FIG. 3 (Prior Art) illustrates the structural makeup of graphene oxide and an exemplary oxide group.

FIG. 3 (Prior Art) illustrates the structural makeup of graphene oxide and an exemplary oxide group. Graphene is impermeable and membranes constructed from it are not known to be used commercially to produce filtration membranes. The introduction of oxides results in a permeable, cross-linked compound.

Figure 4:
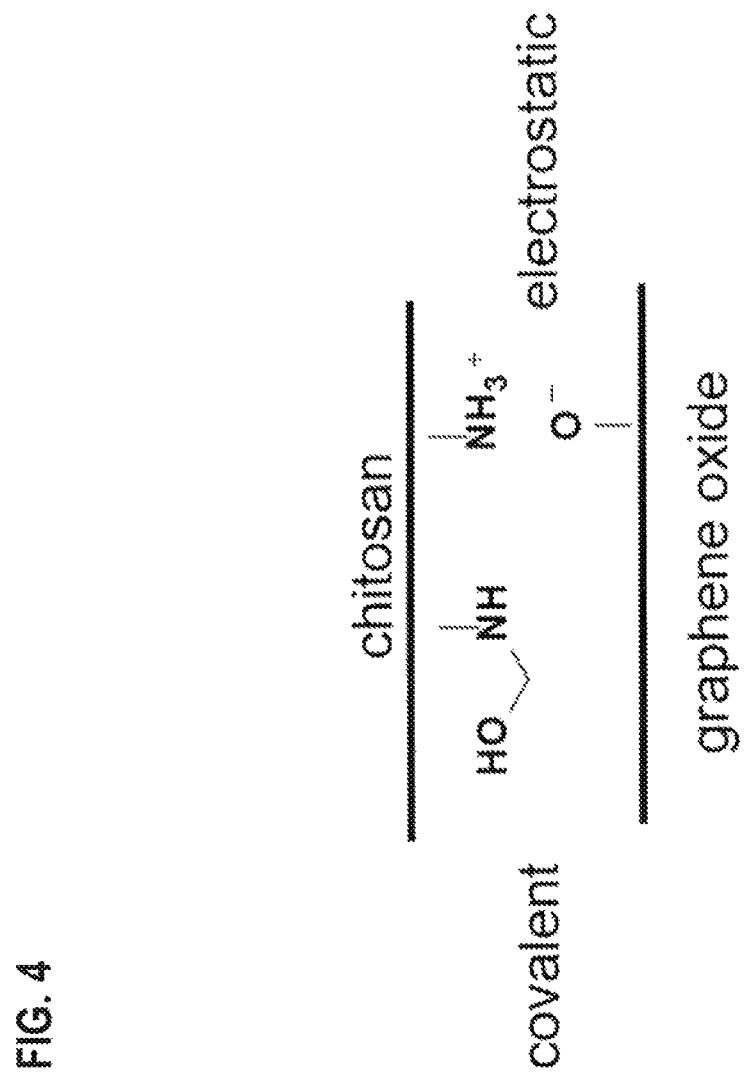
FIG. 4 illustrates the cross-linking of graphene oxide and chitosan.

FIG. 4 illustrates an exemplary layered structure of a CGSO filter. In the exemplary embodiment, the CSGO filter 100 includes a CSGO filtration membrane 10 that is placed between support layers 11a and 11b. Layers 11a and 11b support the filtration membrane 10 to prevent swelling and deformation.

In the exemplary embodiment shown, the CSGO filtration membrane 10 is placed between two nitrocellulose filters, which provide stability in a cross flow system. Nitrocellulose is selected because it non-reactive with contaminants passing through and is scalable. Other materials with similar characteristics may be substituted.

In other embodiments, the support layers 11a and 11b may be comprised of different material such as paper, glass wool and permeable plastic.

Figure 5:
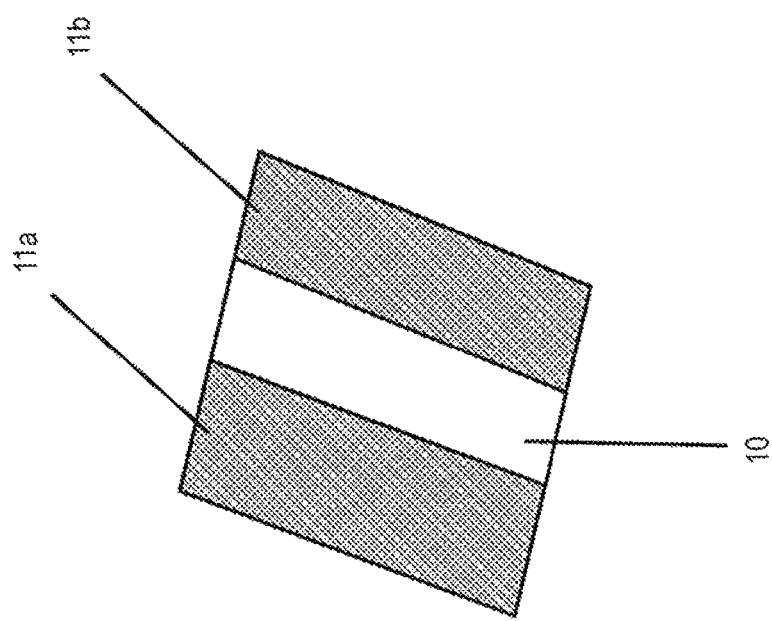
FIG. 5 illustrates an exemplary layered structure of a CGSO filter.
Figure 6:
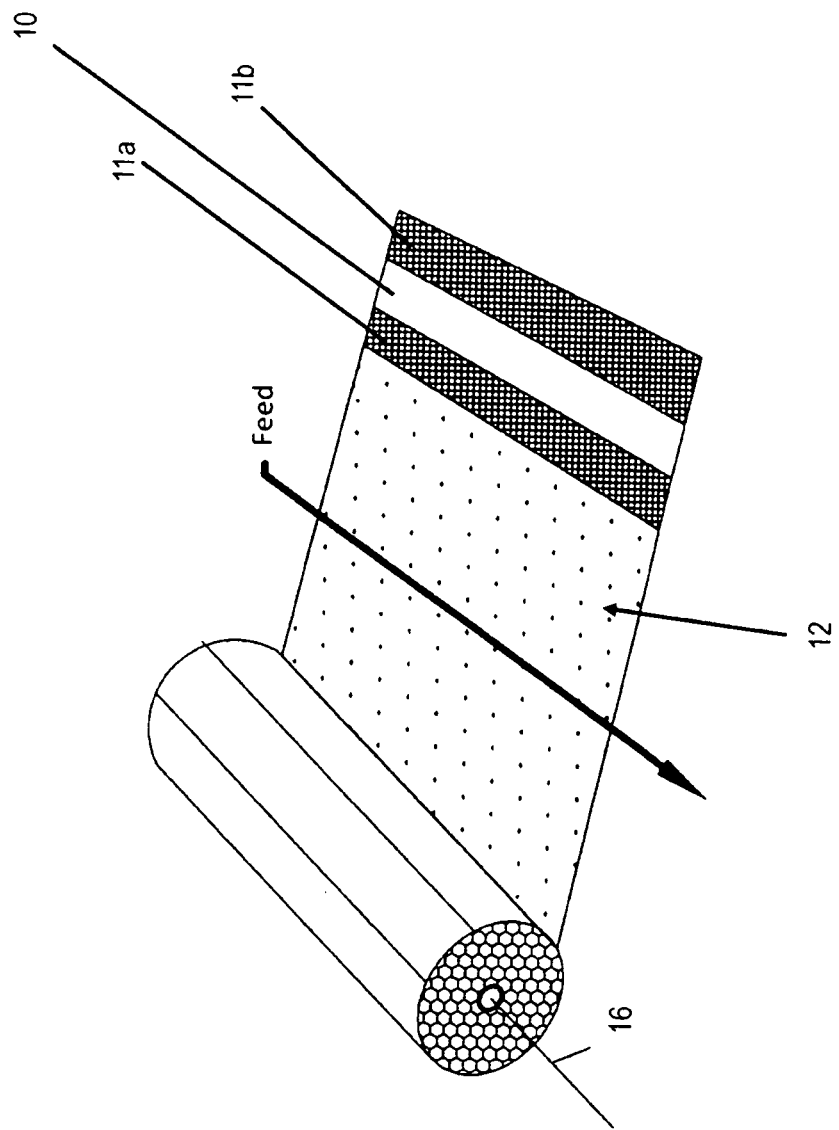
FIG. 6 illustrates a CGSO filter which is spiral shaped.

FIG. 5 illustrates a CGSO filter which is spiral shaped. Visible elements of the spiral shaped CSGO filter 102 includes the CGSO filtration membrane 10 and support layers 11a and 11b. As noted, layers 11a and 11b are constructed of a permeable material which supports cross-flow motion of passing fluids, gases, etc.

The spiral shaped CSGO filter 102 may also include a spacing layer 12. The spacing layer 12 is in an optional layer used in the spiral embodiment to create additional spacing for water flow between respective support layers 11a and 11b.

In the exemplary embodiment, the spiral shaped CSGO filter 102 further includes a clean water collection pipe 16. The clean water collection pipe is a structure that allows clean, treated water to be collected and dispersed away from the filter.

What is claimed is:

1. A method of producing a quantity of a graphene oxide compound from a graphene oxide object comprised of a chitosan graphene oxide compound comprising the steps of:
    maximizing solution to solid contact;
    immersing said graphene oxide object in an acidic solution;
    creating a homogeneous solution as said graphene oxide object dissolves; and
    producing a stored graphene oxide compound.

2. The method of claim 1 wherein the step of producing a stored graphene oxide compound further includes the step of evaporating said graphene oxide solution to form a solid.

3. The method of claim 1 wherein the step of producing a stored graphene oxide compound further includes the step of pulverizing said solid to form a powder.

4. The method of claim 1 which further includes the step of storing said graphene oxide compound as a solution.

5. The method of claim 1 wherein the step of producing a stored graphene oxide compound further includes the step of combining a recycled quantity of graphene oxide with a second compound to improve the qualities of said second compound.

6. The method of claim 5 wherein said second compound is concrete.

7. The method of claim 1 wherein said step of maximizing solution to solid contact includes reducing the graphene oxide object into two physical parts.

8. The method of claim 7 which further incudes the step of applying a mechanical process to said graphene oxide object, wherein said mechanical process is selected from a group consisting of punching, shredding and grounding.

9. The method of claim 1, wherein said chitosan graphene oxide compound has a ratio of between two and seven parts of chitosan to each part of graphene.

10. The method of claim 1, wherein said chitosan graphene oxide compound has a ratio of five parts of chitosan to each part of graphene.

11. The method of claim 1 wherein said, graphene oxide object is filter.

12. The method of claim 1 which further includes removing one or more layers of material from said graphene oxide object.

13. The method of claim 1 wherein said solution is an acetic acid solution consisting of 8.3mL of 99% glacial acid per liter of water.

* * * * *